United States Patent

Boutet

[15] 3,638,479
[45] Feb. 1, 1972

[54] TESTING DEVICE FOR THREADED ASSEMBLING MEANS OR FASTENERS

[72] Inventor: Jean Boutet, Chatou, France
[73] Assignee: Chrysler France, Paris, France
[22] Filed: Mar. 30, 1970
[21] Appl. No.: 23,837

[30] Foreign Application Priority Data

Apr. 2, 1969  France..................................6910022

[52] U.S. Cl. ..........................................73/88 F, 73/141 A
[51] Int. Cl. .....................................................G01n 3/08
[58] Field of Search..........................73/141, 88 F, 95, 141 A; 33/147 C, 172 C

[56] References Cited

UNITED STATES PATENTS

| | | | |
|---|---|---|---|
| 1,027,300 | 5/1912 | Wazan................................73/141 A |
| 1,888,755 | 11/1932 | Barr et al. ..............................73/95 X |
| 2,030,464 | 2/1936 | Nilson....................................73/95 X |
| 3,382,709 | 5/1968 | Sorensen...............................73/88 F |
| 3,429,179 | 2/1969 | Bowen et al. ........................73/141 X |

*Primary Examiner*—Jerry W. Myracle
*Attorney*—Steinberg & Blake

[57] ABSTRACT

A threaded assembling means to be tested is mounted between a rotatable annular plate and a stationary endpiece respectively carried by one end of a generally tubular fixture and the corresponding end of an extensometer gauge, the opposite ends of which are screwed to a common base member. Said gauge consists of a hollow cylindrical body, the internal space of which is filled with a liquid and communicates with an external capillary tube.

10 Claims, 1 Drawing Figure

PATENTED FEB 1 1972
3,638,479
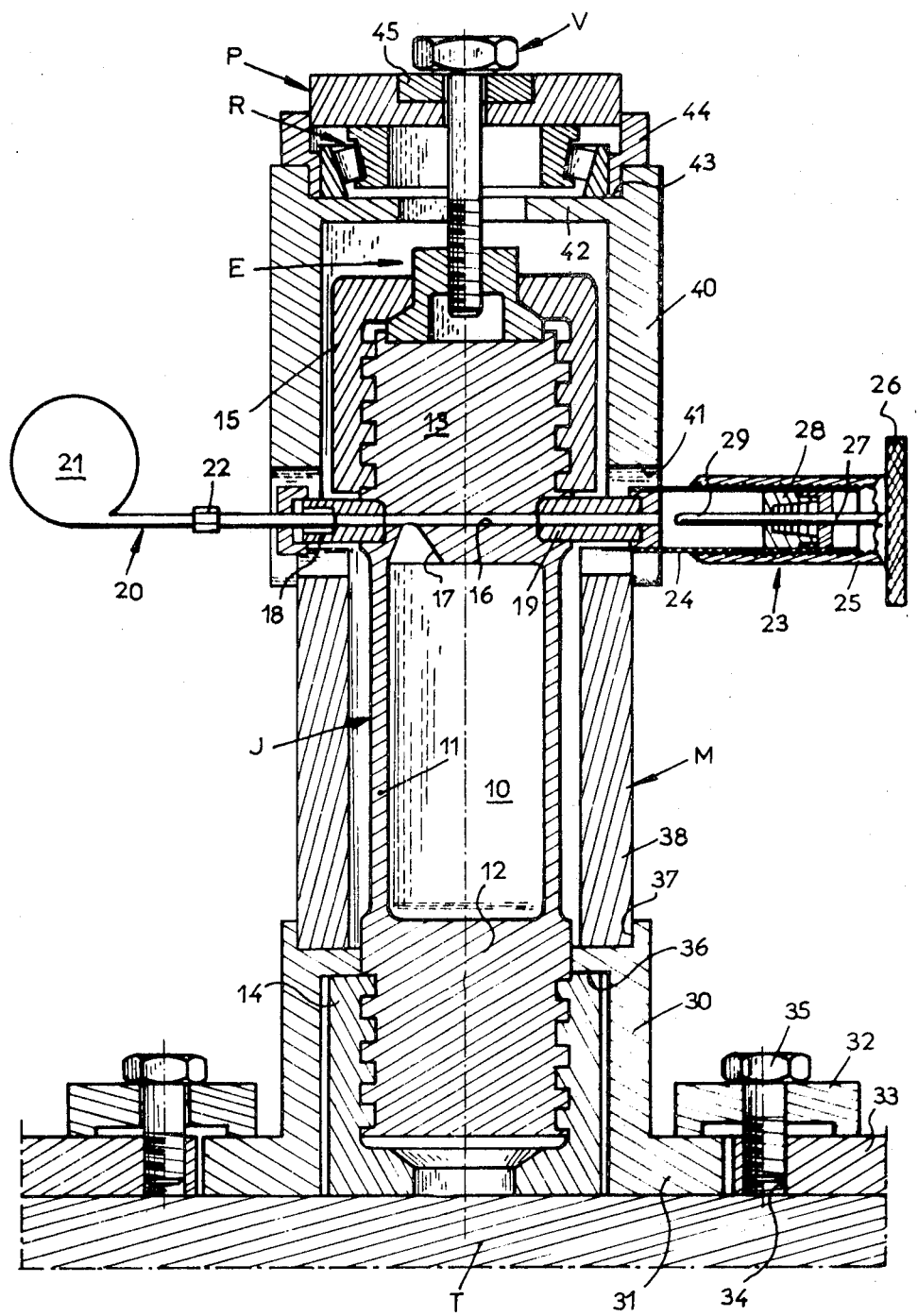
INVENTOR
JEAN BOUTET
BY: Steinberg & Blake
atty.

TESTING DEVICE FOR THREADED ASSEMBLING MEANS OR FASTENERS

The present invention relates to a testing device for determining the stress developed under the action of the clamping torque on threaded assembling means or fasteners such as screws, bolts, nuts or the like.

In mechanical engineering use is made of a great variety of screws, bolts, nuts and other threaded assembling means whose intrinsic characteristics and optimum conditions of use must be accurately determined. Notwithstanding the standardization of the shapes and dimensions of such assembling means, their mechanical characteristics may substantially depart from those which are foreseeable through calculations, owing to inevitable variations in the composition of the material constituting them, the influence of heat or other treatments on the microcrystalline structure of the said material, as well as the accuracy of the dimensions and the surface finish which depend upon the manufacturing method used. Consequently, the carrying out of test programs remains essential in solving the various problems which the threaded assembling means set to research departments, for instance the selection of the dimensions, mechanical characteristics and protective coatings of such means, as well as to method study departments, for instance in determining the values to be assigned to the clamping torques on the assembly lines. At present, the tests performed to this end, such as tensile and hardness tests, are however inconvenient in that they enable only indirect determination of the mechanical characteristics of the threaded assembling means, and, in so far as some of them are concerned, in that they are destructive.

The present invention has for its object to provide a device for nondestructive testing of threaded assembling means or fasteners under conditions which are as close as possible to those of their practical use, enabling to determine through direct reading and unambiguously the value of the stress developed on a threaded assembling means as a result of a given clamping torque.

To this end, the testing device according to the invention is characterized in that it comprises, in combination, a fixture of tubular general shape possessing high resistance to axial compression, along the axis of which is arranged an extensometer gauge of a type known per se, constituted by a hollow cylindrical body the internal space of which is filled with a liquid and communicates with an external capillary tube, one end of the fixture and the corresponding end of the gauge being secured to one and the same base member, while their opposite free and axially spaced ends carry respectively an annular plate provided with a removable bearing and an interchangeable stationary endpiece, between which are mounted the threaded means to be tested.

Advantageously, the said bearing consists of an axial thrust bearing, for instance of the taper roller type, mounted in a ring fitted on the free end of the fixture, and may be provided with spacer rings of various heights placed for instance on a counterbore.

According to another feature of the testing device according to the invention, the said endpiece is provided with an axial passageway which may be tapped or not and is adapted to receive the shank, tapped or not, of the assembling means to be tested, and possibly with a recess shaped so as to receive the head or the nut of the said means.

The said endpiece may be screwed directly on the free end of the gauge or may be held by a screwed cap.

It is immediately apparent that the testing device forming the subject matter of the invention not only has a simple and low-cost structure and is suited for the testing of threaded assembling means of various types, but also enables to accurately measure the stress to which the said means are subjected depending on the clamping torque exerted; indeed, the fact that the plate is supported by the removable thrust bearing enables to remove the effect of friction at the bearing face of the head, the measurement of the tensile stress obtained under such conditions enabling separate calculation of the coefficient of friction at the thread in the absence of the said bearing and, all conditions being equal in other respects, the measurement of the tensile stress enables to calculate the coefficient of total friction; the coefficient of friction at bearing face of head is deduced from the values of the coefficient of total friction and of friction at thread, which are all the more accurately determined as the clamping torques are more accurately known, on the basis of the tensile stress measurements performed by the extensometer gauge.

According to still another feature of the invention, the internal space of the gauge communicates, on the one hand, with a capillary tube comprising, outside the fixture, a transparent portion provided with a reference member and, on the other hand, with a chamber provided with a plunger, the travel of which is controlled by a micrometer screw.

Advantageously, a graduation in units of tensile force is associated with the micrometer screw.

These arrangements enable to readily carry out the measurement of the tensile stress by a zero method ensuring excellent accuracy independently of the influence of any external parameter.

The invention will be better understood and other objects, characteristics and advantages thereof will appear as the following explanatory description proceeds with reference to the appended diagrammatic drawing, given by way of example only, illustrating one form of embodiment of the invention and the single FIGURE of which shows an axial sectional view of a device according to the invention for testing threaded assembling means.

The testing device shown in the drawing comprises essentially a fixture M of tubular general shape, one end of which is secured to a worktable T and along the axis of which is mounted an extensometer gauge J, the threaded assembling means to be tested, for instance a screw V, being mounted between an endpiece E secured to the free end of the gauge J and a rotary plate P mounted at the corresponding end of the fixture M.

The extensometer gauge J is essentially constituted by a so-called "Amsler" calibrating device formed of a body of cylindrical general shape comprising a central cavity 10 defined by a lateral wall 11 of small thickness between two solid end portions 12, 13 respectively provided with screwed caps 14, 15, the thread being advantageously of the SI small-pitch type. The upper solid portion 13 is provided with a thin transverse channel 16 communicating with the cavity 10 through a passageway 17; at the end openings of the channel 16 are mounted couplings 18, 19 carrying respectively a capillary tube 20 and a calibrating and measuring device 23. The capillary tube 20, made from glass or any other appropriate transparent material, ends in an expansion sphere or ball 21 and carries a reference member 22 constituted for instance by a ring mounted so as to slide with an easy fit. The calibrating and measuring device 23 comprises essentially a tube 24, one end of which is sealingly secured to the coupling 19 and the opposite end of which is threaded with a very fine pitch and receives a hollow screw 25 whose knurled head 26 carries an axial shank or stem 27 passing through a seal 28 so as to constitute a micrometric-travel plunger 29. The cavity 10 of the gauge J and the accessory parts thereof, with the exception of the sphere or ball 21, are filled with a liquid, preferably mercury; the expansion sphere 21 is advantageously filled with an inert gas under pressure, in order to avoid any break or gap in the column of mercury of the capillary tube 20.

The gauge J is mounted coaxially with the fixture M which has a generally tubular shape and comprises essentially a clamping base member 30 and a head 40 surrounding respectively the solid portions 12 and 13 of the gauge J, and interconnected by an intermediate sleeve 38 concentric with the wall 11 of the said gauge.

The clamping base member 30 is formed of a tubular member comprising at its lower end an external, perfectly plane clamping portion 31 which is held applied on the worktable T by means of bridge members or dogs 32 bearing upon blocks 33 solid with the said table and provided with tapped holes 34 which receive screws 35 for clamping the bridge member 32. At its upper end, the clamping base member 30 comprises, on the one hand, an internal shoulder 36 engaging the end surface of the screwed cap 14 of the gauge J and, on the other hand, an annular flange 37 enabling the lower end of the intermediate sleeve 38 to be fitted therein.

The head 40 of the fixture M is also constituted by a tubular member, the lower end of which is fitted on the upper end of the sleeve M, there being provided holes 41 for the passage of the capillary tube 20 and of the calibrating and measuring device 23. At the upper end of the head 40 is formed a transverse annular partition 42 defining a cylindrical recess 43 in which may be fitted either the plate P formed of a thick circular disk provided with a center hole or a shouldered ring 44 provided with a taper roller bearing R carrying said plate and with a recess ensuring the centering. The upper face of the plate P is advantageously provided with a counterbore intended to receive an interchangeable spacing ring 45.

The assembling means to be tested, namely the screw V in the example described, is mounted between the plate P of the fixture M and the endpiece E secured to the solid end portion 13 of the gauge J. The endpiece E is constituted by a member in the shape of a reversed cup, the outer flange of which is confined between the end face of the solid portion 13 and the cap 15 screwed on the latter, the contacting surfaces of the endpiece and of the cap being advantageously spherical. The top of the endpiece E is provided with a tapped hole in which is screwed the threaded shank of the screw V. The tapping of this hole may be dispensed with in case the endpiece is intended for the testing of a bolt and is therefore provided with a cavity of a shape corresponding to that of the head of the said bolt or of the associated nut; of course, endpieces of other, male or female, types may be provided according to test requirements.

The testing device just described operates and is used as follows.

Before a clamping torque is exerted on the head of the screw V, the calibrating device 23 is so actuated that the end of the column of mercury in the capillary tube 20 is located opposite the reference member 22. A clamping torque of a given value is then applied to the screw V, for instance by means of a torque measuring wrench; the resulting tension exerted on the extensometer gauge J results in an elongation of the latter and, therefore, in an increase in capacity of its internal cavity 10, and, consequently, a backward motion of the end of the column of mercury in the capillary tube 20. The volume of mercury thus displaced, which is a measure of the elongation of the gauge J and, therefore, of the tensile force exerted on the latter by the screw V, is determined by means of the micrometer screw comprising the plunger 25, the rotation of which enables to move back the end of the column of mercury opposite the reference member 22 of the capillary tube 20. Subject to previous calibration, the angle of rotation of the micrometer screw 25 therefore measures the axial stress exerted by the screw V under the action of the clamping torque applied thereto; consequently, the graduation associated with the micrometer screw 25 is advantageously made in units of force in order to enable direct reading, one turn of the said screw corresponding for instance to 1,000 daN.

Two tests, one of which is carried out with the plate P bearing directly upon the head 40 of the fixture M and the other with an interposed bearing R, enable to determine the effect of friction at the bearing face of the screwhead for each clamping torque, and, therefore, to calculate the coefficient of friction at the thread. Each measurement requires no more than 1 minute and the accuracy of the direct reading of the stress which is ensured by the device (within ±5 daN) renders much easier the carrying out of the test programs. The device may be adapted to the testing of assembling means of various types by simple changing the endpiece E and/or the spacing ring 45. In all cases, the results of the measurements are more realistic than those of usual tests; in particular, the torque/stress diagrams obtained by means of the device according to the invention indicate unambiguously the effective elastic limit of the means tested under conditions which are as close as possible to those of their practical use.

Thus, as is apparent from the above description, with the structure of the invention there is an internal extensometer gauge of elongated generally cylindrical configuration formed with the central elongated cavity 10 which is surrounded by the relatively thin wall 11 and which is filled with the liquid such as mercury, the extensometer gauge including the capillary tube 20 and the calibrating device 23 which are situated externally of the elongated cylindrical body which is centrally formed with the cavity 10. The elongated cylindrical body of the extensometer gauge has the opposed solid ends 12 and 13, and while the end 12 is fixed to the support means or table T, the opposed free end 13 carries the means formed by the threaded cap 15 and the endpiece E for operatively connecting one end of the threaded fastener which is to be tested to the free end 13 of the elongated cylindrical extensometer body.

This internal extensometer body of elongated cylindrical configuration is closely surrounded by the external elongated hollow generally tubular fixture assembly M which has the lower end or base member 30 fixed with the lower end 12 of the extensometer body to the common support means T, the lower end 12 of course being directly carried by the threaded cap 14 in the example illustrated in the drawing. It will be noted that the base member 30 is formed with the internal collar interposed between the central tubular sleeve portion of the fixture assembly M and the cap 14, at the shoulder defined between the upper end of the cap 14 and the body 12. The central sleeve portion of the fixture, which directly surrounds and is closely spaced from the thin wall 11 of the extensometer gauge has its upper end abutting against the head member 40 which is provided with the transverse annular partition 42 situated beyond the means formed by the cap 15 and endpiece E. This partition 42 defines the recess 43 which receives the annular bearing plate P, the latter forming with the ring 45 a means for operatively connecting the other end of the fastener to be tested to the device of the invention. Thus, through the means P and the means E, 15 the fastener which is to be tested can have a torque applied thereto in a known way so as to tend to displace the free ends of the elongated external sleeve means M and the elongated internal extensometer gauge axially one with respect to the other, and this will of course result in a volumetric change of the cavity 10 which is readily measured.

Of course, the invention is by no means limited to the form of embodiment described and illustrated, which has been given by way of example only. In particular, it comprises all the means constituting technical equivalents to the means described as well as their combinations, should the latter be carried out according to the spirit of the invention.

What is claimed is:

1. A device for nondestructively testing a threaded fastener under conditions simulating actual use, comprising an internal extensometer gauge and an external fixture of generally tubular configuration coaxially surrounding and located closely adjacent to said gauge, said gauge having within said fixture an elongated body of substantially cylindrical configuration formed with a substantially central cavity adapted to be filled with a liquid, said body carrying a capillary tube and calibrating device located externally of said body, and said body having a pair of opposed ends between which said cavity is located, said generally tubular fixture having a base member, an intermediate tubular sleeve portion extending from said base member and surrounding and spaced from said extensometer body, and a head member extending from said intermediate sleeve portion, support means, means fixing one of said ends of said extensometer body and said base member to said support means, the opposed end of said extensometer body and said head member being free with said head member extending beyond said opposed end of said extensometer body, and a pair of means respectively carried by said opposed end of said extensometer body and said head member for operatively connecting a threaded fastener which is to be tested between said pair of means and for converting a rotary force applied to the threaded fastener into an axial force tending to displace said opposed end of said extensometer body and said head member axially one with respect to the other for providing at said cavity of said extensometer a volumetric change which can be measured to determine the axial force applied to the threaded fastener during testing thereof.

2. The combination of claim 1 and wherein said one end of said extensometer body which is fixed to said support means carries a threaded cap defining a shoulder with said body, and said base member having an internal collar interposed between said shoulder and said sleeve portion of said exterior fixture.

3. The combination of claim 1 and wherein said head member has beyond that one of said pair of means which is fixed to said extensometer body an annular inner partition defining an end recess at said head member, and the other of said pair of means which is carried by said head member including a bearing plate removably situated in said recess.

4. The combination of claim 3 and wherein an axial thrust bearing is removably interposed between said bearing plate and said partition.

5. The combination of claim 1 and wherein that one of said pair of means which is fixed to said opposed end of said extensometer body includes a cap threaded onto said opposed end of said extensometer body.

6. The combination of claim 5 and wherein that one of said means which is carried by said opposed end of said extensometer body also includes an endpiece held by said threaded cap on said opposed end of said extensometer body and receiving a threaded portion of the threaded fastener which is tested.

7. The combination of claim 1 and wherein said one of said pair of means carried by said head member includes a bearing plate and a spacing ring interposed between said bearing plate and said fastener which is tested to compensate for variations in the length of the fastener.

8. The combination of claim 1 and wherein that one of said pair of means which is carried by said opposed end of said extensometer body includes a threaded cap threaded onto said opposed end of said extensometer body and an interchangeable endpiece to be connected to the threaded fastener which is to be tested and to be interchanged with other endpieces according to the nature of the threaded fastener which is to be tested.

9. The combination of claim 8 and wherein said endpiece is formed with a threaded bore for receiving a threaded portion of the fastener, and said being formed with a recess having a configuration conforming to that of a nut for receiving a nut connected to a threaded fastener.

10. The combination of claim 1 and wherein said capillary tube is transparent and provided with a reference while said calibrating device consists of a sealed chamber provided with a plunger and a micrometer screw for controlling the travel of said plunger.

* * * * *